(12) United States Patent
Takizawa et al.

(10) Patent No.: US 6,496,522 B1
(45) Date of Patent: Dec. 17, 2002

(54) ATM COMMUNICATION TERMINAL AND ATM COMMUNICATION SYSTEM

(75) Inventors: Masaaki Takizawa, Tokyo (JP); Hirokazu Takeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/087,510

(22) Filed: May 29, 1998

(30) Foreign Application Priority Data

May 30, 1997 (JP) .............................................. 9-141869

(51) Int. Cl.[7] .............................. H04J 3/04; H04J 3/22; H04J 3/24
(52) U.S. Cl. ......................... 370/535; 370/471; 370/474
(58) Field of Search .................................. 370/392, 395, 370/404, 406, 424, 471, 474, 535, 216, 217–220, 221, 225

(56) References Cited

U.S. PATENT DOCUMENTS

| | | | |
|---|---|---|---|
| 4,289,932 A | | 9/1981 | Reed ...................... 179/18 BC |
| 5,150,356 A | * | 9/1992 | Tsutsui ....................... 370/16.1 |
| 5,301,193 A | * | 4/1994 | Toyofuku et al. .......... 370/94.1 |
| 5,636,215 A | * | 6/1997 | Kubo et al. .................. 370/397 |
| 5,771,231 A | * | 6/1998 | Watanabe .................... 370/377 |
| 5,796,720 A | * | 8/1998 | Yoshida et al. ............. 370/245 |
| 5,805,568 A | * | 9/1998 | Shinbashi .................... 370/223 |
| 5,982,743 A | * | 11/1999 | Kusano ....................... 370/217 |
| 6,084,889 A | * | 7/2000 | Murakami ................... 370/474 |

FOREIGN PATENT DOCUMENTS

| | | |
|---|---|---|
| JP | 1132243 | 5/1989 |
| JP | 1-241959 | 9/1989 |

\* cited by examiner

*Primary Examiner*—Alpus H. Hsu
*Assistant Examiner*—Toan Nguyen
(74) *Attorney, Agent, or Firm*—Antonelli, Terry, Stout & Kraus, LLP

(57) ABSTRACT

A communication terminal and a communication system for efficiently using the transmission capacity of a circuit and reducing the circuits disposed between an ATM switch and communication terminals. The communication terminal disassembles multiplexed signals obtained by multiplexing data into cells of fixed length, adds each of the cells with a header containing destination information and transmits/receives a cell through a communication line. The terminal includes a discriminator for referring to the destination information of each cell to discriminate a cell addressed to the ATM communication terminal, a multiplexed signal generator for multiplexed unit data to be transmitted from the communication terminal to generate a multiplexed signal, a cell-forming unit for forming the multiplexed signal into cells, and a cell re-multiplexed for re-multiplexing the cell generated from the multiplexed data and the cells addressed to the other communication terminal.

2 Claims, 11 Drawing Sheets

ATM COMMUNICATION TERMINAL 2

ATM COMMUNICATION TERMINAL AND ATM COMMUNICATION SYSTEM

BACKGROUND OF THE INVENTION

1. Field of the Invention

The present invention relates to an ATM communication system containing plural ATM communication terminals and an ATM switch, and more particularly to an ATM communication system which is suitable for use when the transmission rate of a transmission path for connecting an ATM communication terminal and an ATM switch is higher than the transmission rate of data to be transmitted/received by each ATM communication terminal and the transmission path has extra capacity.

2. Description of Related Art

Recent developments of digital information reducing technologies have promoted international standardizing organizations such as International Organization for Standardization (ISO), International-Telecommunication Union-Telecommunication Standardization Sector (ITU-T), to advance the works for standardization of multimedia coding techniques to reduce multimedia information such as images, sound, etc. and actually have completed some of this work. Of these multimedia coding techniques, a system known as "MPEG-2 (Moving Picture Experts Group-2) which is to be applied to broadcasting and storage media has been known. MPEG-2 enables transmission of images of the current television broadcasting quality at a transmission rate of about 6 to 10 Mbit/s. It also enables transmission of HDTV (High Definition Television) signals having a resolution of twice or more of current televisions in horizontal and vertical directions to be transmitted at a transmission rate of about several tens Mbit/s.

B-ISDN (Broadband-ISDN) which can transmit signals at a transmission rate of 155.52 Mbit/s has been known as a communication infrastructure. ATM (Asynchronous Transfer Mode) has been used as a system for transmitting multiplexed signals by using the B-ISDN. ATM is suitable for use in handling multimedia data of various bit rates which range from low bit-rate data such as audio data to high bit-rate data such as image data. According to the ATM system, a signal such as a video signal, an audio signal, a data signal or the like is disassembled into 48-byte unit signals. Each of the 48-byte unit signals thus obtained is added with a header (describing a destination or the like) of 5 bytes and then transmitted. The signal of 53 bytes in total, which is obtained by adding the 48-byte unit signal with the header of 5 bytes, is called a cell.

In ATM, when information to be transmitted does not reach 155.52 Mbit/s, null information called a null cell is transmitted to match the transmission rate to the transmission rate of the transmission path. In this case, a signal comprising a combination of a cell containing data and a null cell, that is, a cell which is matched with the transmission rate of the transmission path is hereinafter referred to as "ATM signal".

In the conventional technique, when signals reduced by MPEG-2 described above are transmitted in ATM by using B-ISDN, the ATM signal of 155.52 Mbit/s contains cells having effective data of only 6 to 10 Mbit/s, and thus the residual bits of 145 to 149 Mbit/s are allocated to null cells.

Further, in the conventional technique, when many ATM communication terminals are mutually communicated to one another through an ATM switch, a line 12 must be provided between the ATM switch 5 and each of the plural ATM communication terminals 13, as shown in FIG. 12. Therefore, work for laying new lines must be performed with new ATM communication terminals, and the cost for establishing the system is increased.

SUMMARY OF THE INVENTION

An object of the present invention is to provide an ATM communication terminal and an ATM communication system which can solve the above problem and efficiently use the transmission capacity of a communication circuit.

Further, another object of the present invention is to provide an ATM communication terminal and an ATM communication system which can reduce the number of lines disposed between an ATM switch and each of ATM terminals constituting the system irrespective of the number of the terminals.

In order to solve the above problem, an ATM communication terminal according to the present invention has a function of disassembling multiplexed signals obtained by multiplexing data into cells of a fixed length, adding each of the cells with a header containing destination information and transmitting/receiving the cells through a communication line, and comprises a discriminator for referring to the destination information of the cells which are received through the communication line to identify a cell addressed to the communication terminal which received the cell (or, hereinafter referred to as "self communication terminal") and a cell addressed to another communication terminal from each other, a multiplexed-signal generator for multiplexing data to be transmitted from the self communication terminal to generate multiplexed signals, a cell forming unit for forming the multiplexed signals generated in the multiplexed signal generator into cells, and a cell re-multiplexer for re-multiplexing the cell generated from the multiplexed data to be transmitted from the self communication terminal and the cell addressed to another communication terminal which is discriminated in the discriminator.

Further, a communication network is formed in a ring shape among plural communication terminals, and cells which are received through the communication network by a communication terminal concerned (self communication terminal) and are to be transmitted to (i.e., are addressed to) other communication terminals are multiplexed with cells obtained by forming data to be transmitted from the communication terminal in question into cells, and then the cell-multiplexed cells are transmitted to a transmission path, whereby the cell-multiplexed cells transmitted from the plural communication terminals are allowed to make the round on the ring.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

A first embodiment according to the present invention will be described hereunder.

Figure 1:
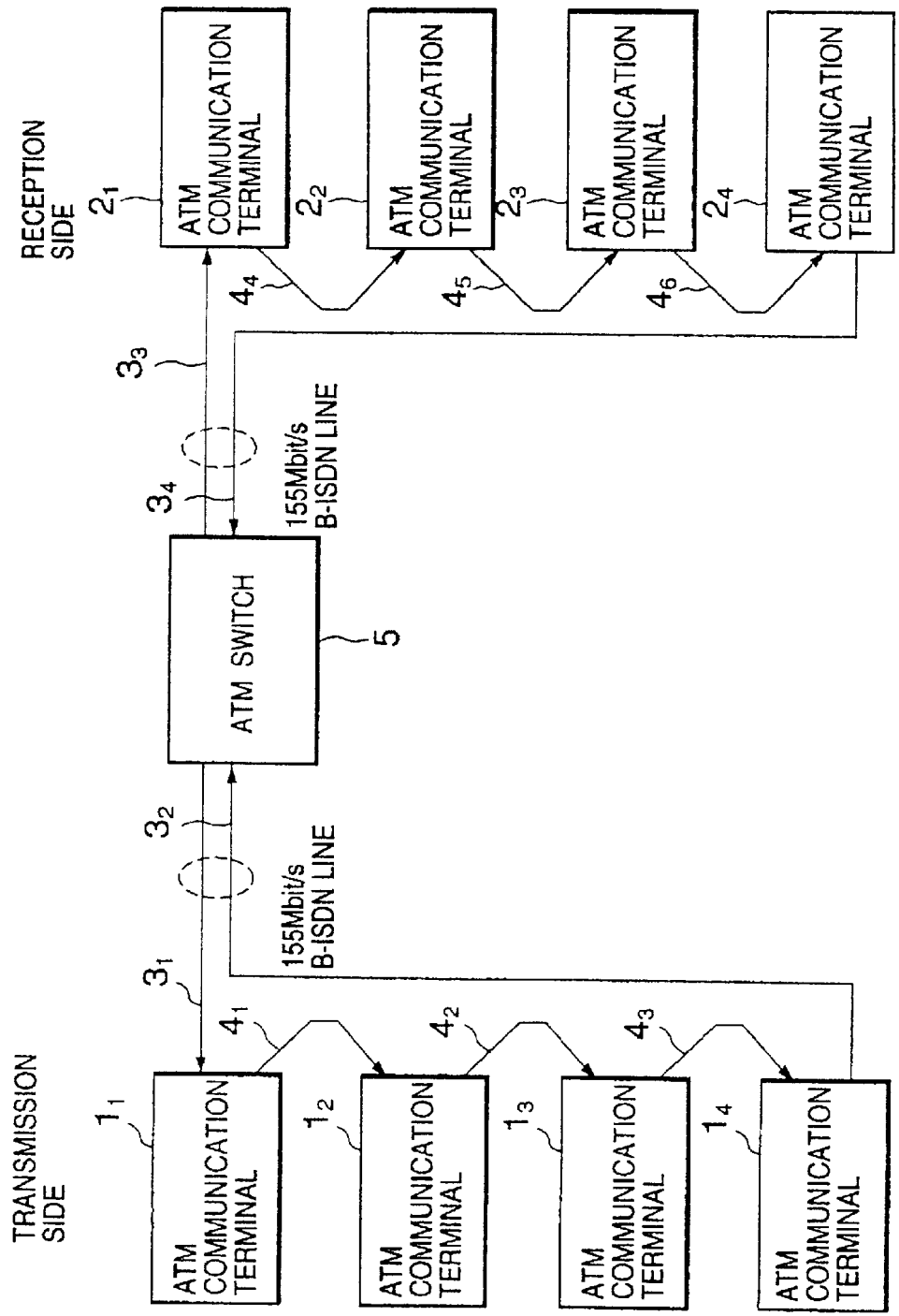
FIG. 1 is a diagram showing the configuration of an ATM communication system according to a first embodiment of the present invention.

FIG. 1 is a diagram showing the construction of an ATM communication system according to the first embodiment of the present invention.

Here, reference numerals $1_1$ to $1_4$ represent ATM communication terminals at a transmission side, reference numerals $2_1$ to $2_4$ represent ATM communication terminals at a reception side, reference numerals $3_1$ to $3_4$ represent B-ISDN lines, reference numerals $4_1$ to $4_6$ represent connection lines (for example, optical fibers) which can transmit signals at a transmission rate of B-ISDN, and a reference numeral 5 represents an ATM switch.

First, the connection of the lines $3_1$ to $3_4$ (or, hereinafter merely referred to as "line 3") and the connection lines $4_1$ to $4_6$ (or, hereinafter merely referred to as "connection line 4") will be described.

The lines $3_1$, $3_2$ are used to connect the ATM switch 5 to the respective ATM communication terminals $1_1$ to $1_4$. The line $3_1$ is connected to the ATM switch 5 at one end thereof, and connected to the input terminal of the ATM communication terminal $1_1$ at the other end thereof. The line $3_2$ is connected to the ATM switch 5 at one end thereof and connected to the output terminal of the ATM communication terminal $1_4$ at the other end thereof.

The lines $3_3$, $3_4$ are used to connect the ATM switch 5 to the respective ATM communication terminals $2_1$ to $2_4$. The line $3_3$ is connected to the ATM switch 5 at one end thereof, and connected to the input terminal of the ATM communication terminal $2_1$ at the other end thereof. The line $3_4$ is connected to the ATM switch 5 at one end thereof and connected to the output terminal of the ATM communication terminal $2_4$ at the other end thereof.

The connection lines $4_1$ to $4_3$ are used to connect the ATM communication terminals $1_1$ to $1_4$ to one another. The connection line $4_1$ is connected to the output terminal of the ATM communication terminal $1_1$ at one end thereof, and connected to the input terminal of the ATM communication terminal $1_2$ at the other end thereof. The connection line $4_2$ is connected to the output terminal of the ATM communication terminal $1_2$ at one end thereof and connected to the input terminal of the ATM communication terminal $1_3$ at the other end thereof. The connection line $4_3$ is connected to the output terminal of the ATM communication terminal $1_3$ at one end thereof and connected to the input terminal of the ATM communication terminal $1_4$ at the other end thereof.

The connection lines $4_4$ to $4_6$ are used to connect the ATM communication terminals $2_1$ to $2_4$ to one another. The connection line $4_4$ is connected to the output terminal of the ATM communication terminal $2_1$ at one end thereof, and connected to the input terminal of the ATM communication terminal $2_2$ at the other end thereof. The connection line $4_5$ is connected to the output terminal of the ATM communication terminal $2_2$ at one end thereof, and connected to the input terminal of the ATM communication terminal $2_3$ at the other end thereof. The connection line $4_6$ is connected to the output terminal of the ATM communication terminal $2_3$ at one end thereof, and connected to the input terminal of the ATM communication terminal $2_4$ at the other end thereof.

Through the lines 3 and the connection lines 4 of B-ISDN thus connected, the ATM communication terminals $1_1$ to $1_4$ at the transmission side and the ATM switch 5, and the ATM communication terminals $2_1$ to $2_4$ at the reception side and the ATM switch 5 are respectively connected in the ring configuration.

Next, the ATM communication terminals $1_1$ to $1_4$ at the transmission side (or, hereinafter merely referred to as "ATM communication terminal 1") will be described.

The ATM communication terminal 1 at the transmission side re-multiplexes a multiplexed signal transmitted from the upstream side thereof and a multiplexed signal generated by the ATM communication terminal 1 itself, and then transmits the re-multiplexed signal to the downstream side thereof.

Figure 2:
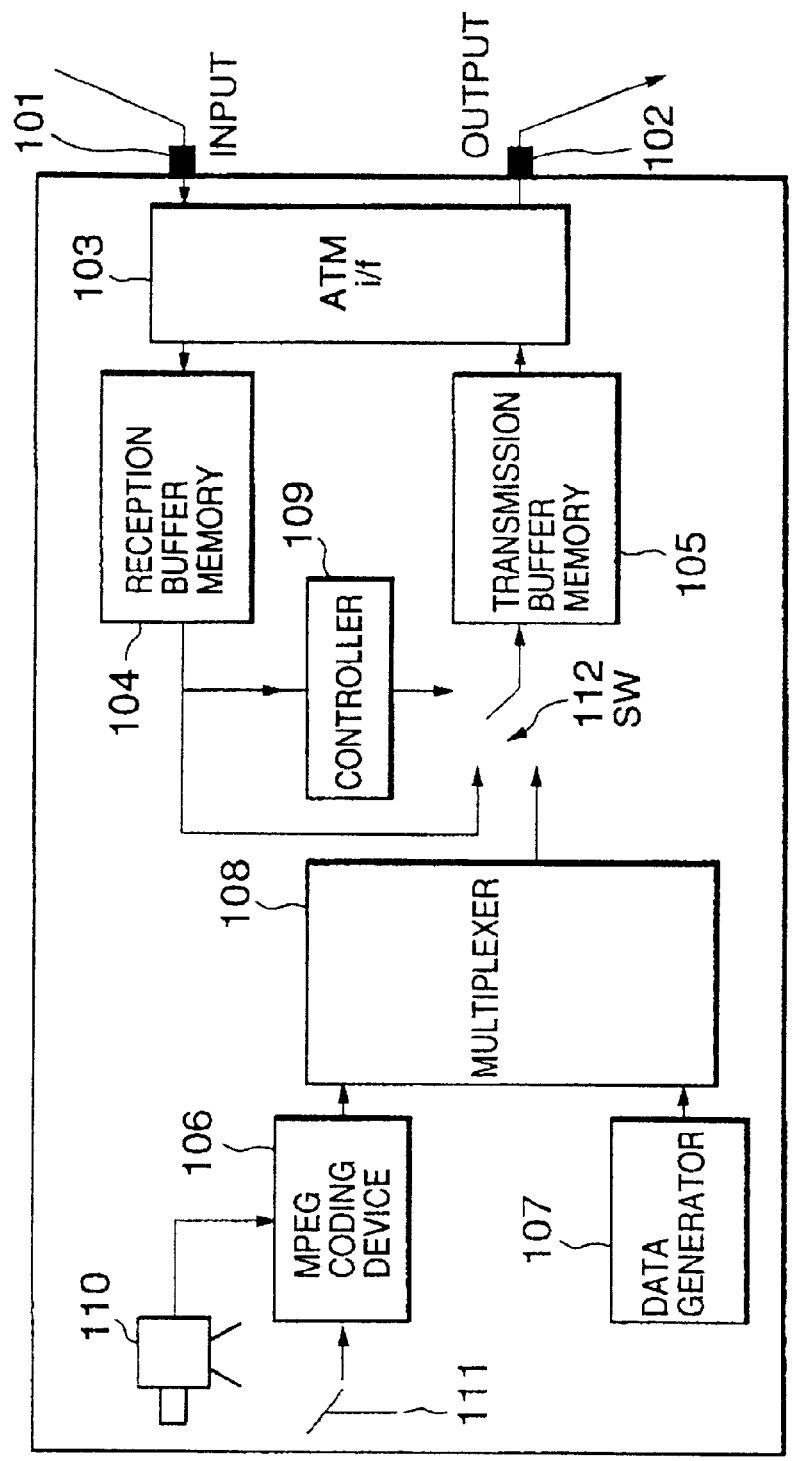
FIG. 2 is a diagram showing the configuration of an ATM communication terminal 1 at a transmission side shown in FIG. 1.

FIG. 2 is a diagram showing the configuration of the ATM communication terminal 1 at the transmission side.

Here, reference numeral 101 represents an input terminal for ATM signals, reference numeral 102 represents an output terminal for ATM signals, reference numeral 103 represents an ATM interface, reference numeral 104 represents a buffer memory for reception, reference numeral 105 represents a buffer memory for transmission, reference numeral 106 represents an MPEG coding device, reference numeral 107 represents a data generator, reference numeral 108 represents a multiplexer, reference numeral 109 represents a controller, reference numeral 110 represents a camera, reference numeral 111 represents a microphone, and reference numeral 112 represents a switch.

The ATM interface 103 receives an ATM signal through the input terminal 101 to discard null cells from the ATM signal received and assemble a multiplexed signal for every destination information which is affixed to the header of each of the residual cells. Thereafter, it stores the multiplexed signal thus assembled into the buffer memory 104.

Further, the ATM interface 103 reads out a multiplexed signal stored in the buffer memory 105 and disassembles the multiplexed signal thus read into cells. Further, the ATM interface 103, if necessary, adds null cells to the cells thus generated so as to match the transmission rate of the B-ISDN line, and then transmits these cells from the output terminal 102.

The MPEG coding device 106 reduces TV signals obtained by the camera 110 or audio signals obtained by the microphone 111 on the basis of the MPEG system to generate a high-efficiency coded signal.

The data generator 107 generates data according to a user's instruction, for example.

The multiplexer 108 multiplexes the high-efficiency coded signal of images or sounds (voices) generated in the MPEG coding device 106 or the data generated in the data generator 107 to generate a multiplexed signal.

The controller 109 switches the input to the buffer memory 105 to any one of the output of the buffer memory 104 and the output of the multiplexing device 108 by changing over the switch 112.

Figure 3:
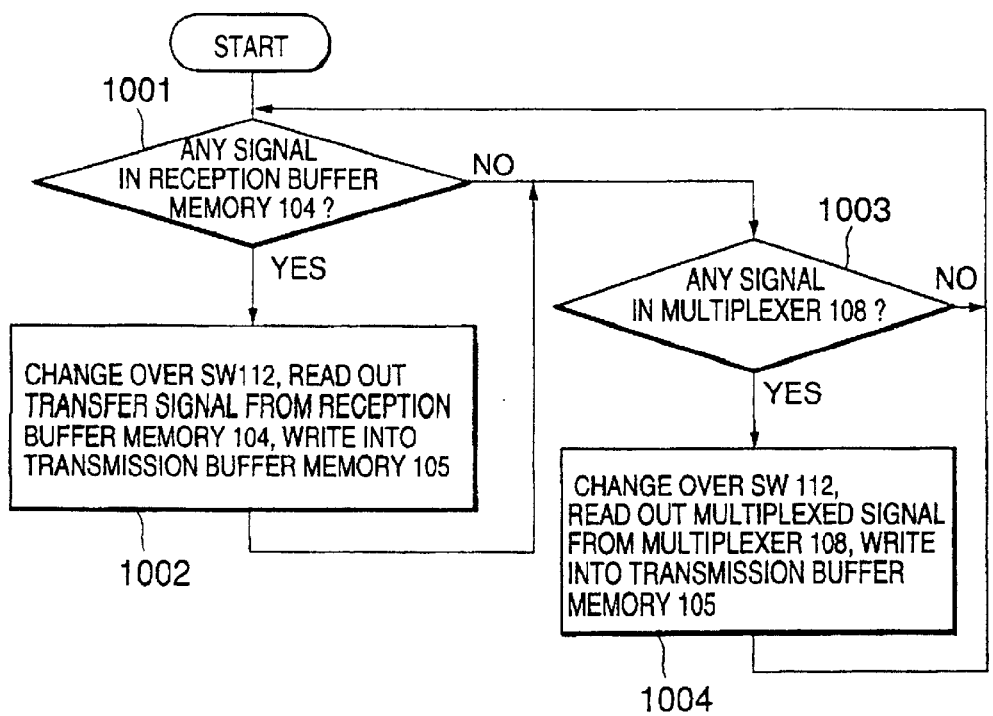
FIG. 3 is a flowchart showing the operation of a controller 109 shown in FIG. 2.

FIG. 3 is a flowchart showing the operation of the controller 109.

In step 1001, it is checked whether or not the multiplexed signal is stored in the buffer memory 104. If no multiplexed signal is stored in the buffer memory 104, the processing goes to step 1003. On the other hand, if it is detected that some multiplexed signal is stored, the processing goes to step 1002 to change over the switch 112 to connect the buffer memory 104 and the buffer memory 105 to each other and shift the multiplexed signal stored in the buffer memory 104 to the buffer memory 105.

In step 1003, it is checked in the multiplexer 108 whether or not preparation for generation of a multiplexed signal is started. For example, this check work can be achieved by checking whether the signal is generated in the MPEG coding device 106 or the data generator 107.

If the preparation is started, the processing goes to step 1004 to change over the switch 112 so that the multiplexing device 108 is connected to the buffer memory 105 and the multiplexed signal generated in the multiplexer 108 is stored into the buffer memory 105. On the other hand, if the preparation is not started, the processing goes back to step 1001.

Next, the operation of the ATM communication terminal 1 at the transmission side thus constructed will be described.

The ATM interface 103 extracts the multiplexed signal transmitted from the upstream side thereof from the ATM signal which is input through the input terminal 101, and stores the extracted multiplexed signal into the buffer memory 104. The controller 109 shifts the multiplexed signal stored in the buffer memory 104 to the buffer memory 105 by changing over the switch 112. The controller 109 changes over the switch 112 to store the multiplexed signal stored in the multiplexer 108 into the buffer memory 105.

When the multiplexed signal transmitted from the upstream side and the multiplexed signal generated in the multiplexer 108 are stored into the buffer memory 105, the ATM interface 103 disassembles each of these multiplexed signal into cells, adds null cells to these cells, if necessary, and then transmits these cells from the output terminal 102.

Through the above operation, the ATM interface 103 re-multiplexes and transmits the multiplexed signal transmitted from the upstream side thereof and the multiplexed signal generated by itself.

Next, the ATM communication terminals $2_1$ to $2_4$ at the reception side (or, hereinafter referred to as "ATM communication terminal 2") will be described.

The ATM communication terminal 2 at the reception side picks up a cell addressed thereto from the ATM signal transmitted from the upstream side thereof, and transmits the residual cells to the downstream side thereof.

Figure 4:
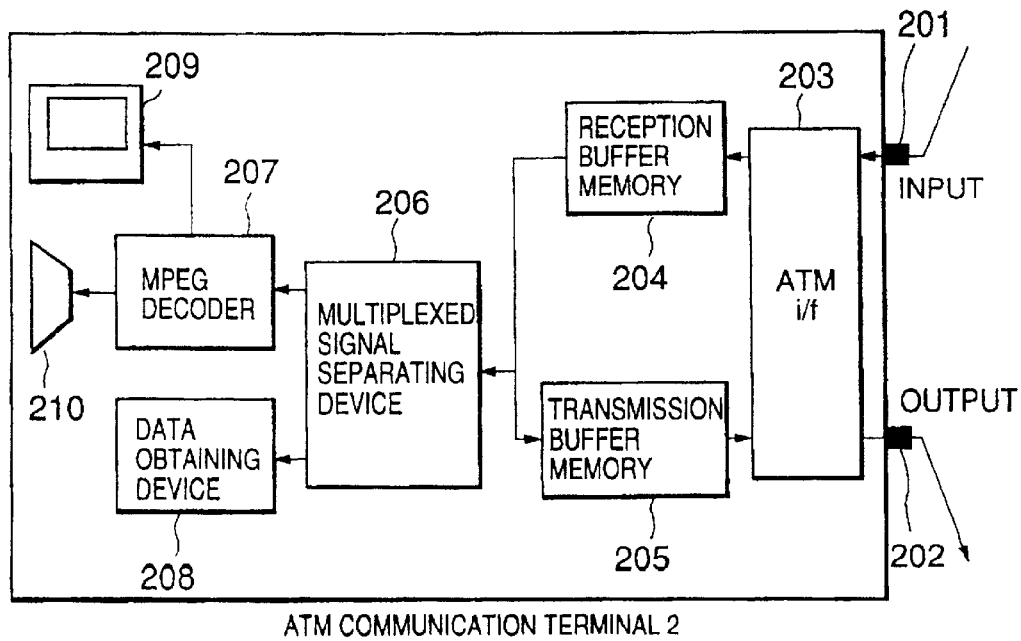
FIG. 4 is a diagram showing the configuration of an ATM communication terminal 2 at a reception side shown in FIG. 1.

FIG. 4 is a diagram showing the configuration of the ATM communication terminal 2 at the reception side.

Here, reference numeral 201 represents an input terminal for the ATM signal, reference numeral 202 represents an output terminal for the ATM signal, reference numeral 203 represents an ATM interface, reference numeral 204 represents a reception buffer memory, reference numeral 205 represents a transmission buffer memory, reference numeral 206 represents a multiplexed signal separating device, reference numeral 207 represents an MPEG decoding device, reference numeral 208 represents a data obtaining device, reference numeral 209 represents a monitor and reference numeral 210 represents a speaker.

The ATM interface 203 receives ATM signals through the input terminal 201. It discards null cells from the ATM signals thus received, assembles multiplexed signals on the basis of each destination information which is affixed to the header of each cell, and then stores the assembled multiplexed signals into the buffer memory 204.

Further, the ATM interface 203 investigates the destination information of the multiplexed signals stored in the buffer memory 204 to shift multiplexed signals addressed to ATM communication terminals 2 located at the downstream side thereof to the buffer memory 205 and transmit the multiplexed signal addressed thereto (that is, to the ATM communication terminals 2 which received the ATM signals) to the multiplexed signal separating device 206.

Further, the ATM interface 203 reads out the multiplexed signal stored in the buffer memory 205 and disassembles it into cells. Each cell thus generated is applied with a null cell so as to match the transmission rate of the B-ISDN line, if necessary, and transmitted from the output terminal 202.

The multiplexed signal separating device 206 separates the multiplexed signal transmitted from the buffer memory 204 into a high-efficiency coded signal for TV signals, a high-efficiency coded signal for audio signals and data.

The MPEG coding device 207 decodes each of the high-efficiency coded signal for TV signals and the high-efficiency coded signal for audio signals which are obtained in the multiplexed signal separating device 206. The TV signals and the audio signals thus decoded are output from the monitor 209 and the speaker 210, respectively.

The data obtaining device 208 obtains the data which is obtained in the multiplexed signal separating device 206. This data is used in its own ATM communication terminals 2 or at the outside.

Next, the operation of the ATM communication terminal 2 at the reception side will be described.

The ATM interface 203 picks up multiplexed signals transmitted from the upstream side thereof from an ATM signal which is input through the input terminal 201, and stores these signals into the buffer memory 204. Thereafter, it shifts multiplexed signals which are contained in the multiplexed signals thus stored and addressed to ATM communication terminals 2 located at the downstream side thereof to the buffer memory 205, disassembles the multiplexed signals in the buffer memory 205 into cells and then outputs these cells from the output terminal 202.

On the other hand, the ATM interface 203 transmits a multiplexed signal addressed thereto (that is, to the ATM communication terminals 2 which received the ATM signals) to the multiplexed signal separating device 206. The multiplexed signal separating device 206 receives and separates the multiplexed signal, and supplies the separated multiplexed signal to the MPEG decoding device 207 and the data obtaining device 208.

With the above operation, the multiplexed signal which is addressed to the ATM communication terminals 2 which received the ATM signals (or self ATM communication terminals 2) is read out, as well as the multiplexed signals which are addressed to the ATM communication terminals 2 located at the downstream side thereof is transmitted.

Next, the ATM switch 5 will be described.

An ATM switch which is used in the normal ATM communication system may be used as the ATM switch 5. However, it is necessary to set that when destination information affixed to the header of a cell indicates the ATM communication terminals $2_1$ to $2_4$ at the reception side, the cell concerned is transmitted to the line $3_3$ of FIG. 1. That is, virtual channel of the ATM communication terminals $2_1$ to $2_4$ are allocated in the line $3_3$.

According to the ATM communication system of the first embodiment as described above, each of the ATM communication terminals $1_1$ to $1_4$ at the transmission side re-multiplexes the multiplexed signal transmitted from the upstream side of the ATM communication terminal concerned and the multiplexed signal which is generated by the ATM communication terminal concerned and addressed to at least one of the ATM communication terminals $2_1$ to $2_4$ at the reception side, and transmits the re-multiplexed signal to the downstream side thereof.

Finally, the signal obtained by re-multiplexing the multiplexed signals generated in the respective ATM communication terminals $1_1$ to $1_4$ is transmitted from the ATM communication terminal $1_4$ to the B-ISDN line $3_2$. The re-multiplexed signal which is transmitted onto the line $3_2$ is transmitted onto the B-ISDN line $3_3$ through the ATM switch 5.

On the other hand, each of the ATM communication terminals $2_1$ to $2_4$ at the reception side separates the re-multiplexed signal transmitted from the upstream side of the ATM communication terminal concerned to obtain the multiplexed signal address thereto, and the multiplexed signal addressed to at least one of the ATM communication terminals $2_1$ to $2_4$ located at the downstream is re-multiplexed and transmitted.

Accordingly, according to this embodiment, the multiplexed signal generated by the ATM communication terminal 1 at the reception side can be transmitted to the ATM communication terminal 2 at the reception side by using the route comprising the line $3_2$—the ATM switch 5—the line $3_3$.

As described above, according to this embodiment, the multiplexed signals generated by a plurality of ATM communication terminals 1 are transmitted to one B-ISDN line 3, and thus the transmission capacity of B-ISDN can be efficiently used. Further, the number of line to be disposed between the ATM switch and the ATM communication terminals can be reduced as much as possible irrespective of the number of the ATM communication terminals constituting the system.

In the above-described first embodiment, both the group of the ATM communication terminals 1 at the transmission side and the ATM switch 5 and the group of the connection of the ATM communication terminals 2 at the reception side and the ATM switch 5 establishes the ring-shaped connection separately and independently. However, the present invention is not limited to this mode. For example, the connection may be made so that the ATM communication terminals 1 at the transmission side and the ATM communication terminals 2 at the reception side coexist in one ring.

Further, in the above-described first embodiment, the ATM communication terminal 1 at the transmission side and the ATM communication terminal 2 at the reception side are separately used, as ATM communication terminals. However, the present invention is not limited to this mode. For example, each of the ATM communication terminals constituting the ATM communication system may be designed to serve as an ATM communication terminal at the transmission side and also serve as an ATM communication terminal at the reception side.

In this case, an ATM communication system which is suitable for use in an interactive communication system for handling images on a real-time basis, such as a video phone, video conference equipment, etc. can be constructed.

Next, a second embodiment according to the present invention will be described.

The ATM communication system of the second embodiment is characterized in that in the ATM communication system shown in FIG. 1, each of the ATM communication terminals at the transmission side and the reception side is provided with a bypass device which forms a transmission path for bypassing the ATM communication terminal.

Figure 5:
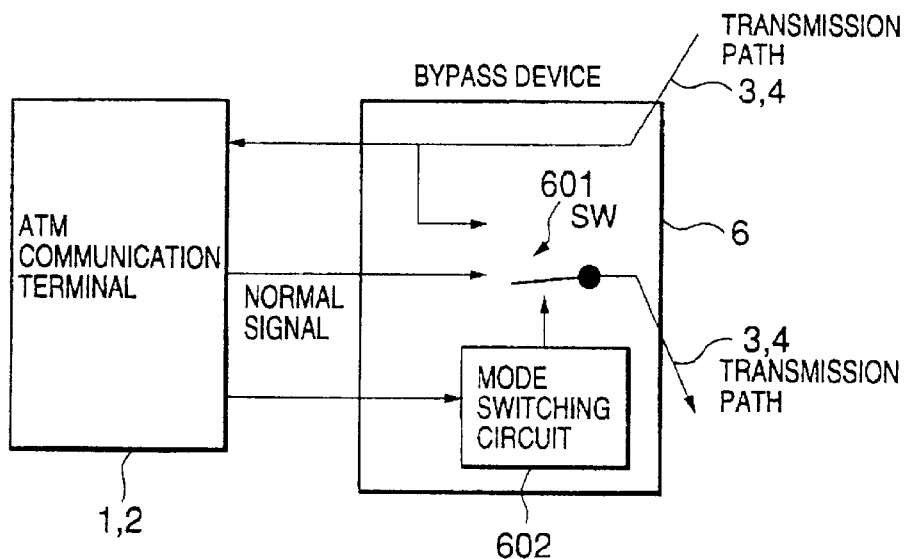
FIG. 5 is a diagram showing a bypass device 6 according to a second embodiment of the present invention.

FIG. 5 is a diagram showing the configuration of the bypass device 6 used in the second embodiment of the present invention.

The bypass device 6 includes, as shown in FIG. 5, a switch 601 for connecting a transmission path at the upstream side of the ATM communication terminal to the input terminal of the ATM communication terminal concerned or a transmission path at the downstream side of the ATM communication terminal concerned, and a mode switching circuit 602.

The mode switching circuit 602 serves to control the switch 601.

Figure 6:
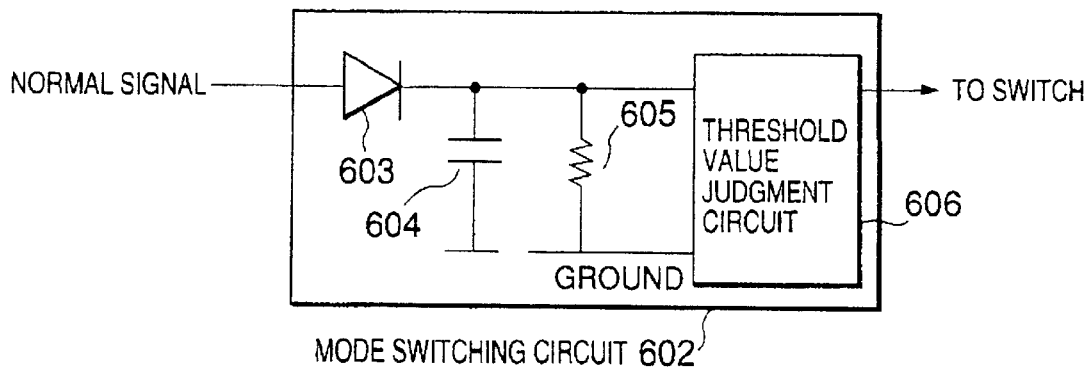
FIG. 6 is a diagram showing the configuration of a mode switching circuit 602 shown in FIG. 5.

FIG. 6 is a diagram showing the construction of the mode switching circuit 602. Here, reference numeral 603 represents a diode, reference numeral 604 represents a capacitor, reference numeral 605 represents a resistor and reference numeral 606 represents a threshold value judgment circuit.

When a normal signal indicating that an ATM communication terminal operates normally is output from the ATM communication terminal concerned, the normal signal is stored as charge in the capacitor 605 through the diode 603. When the output of the normal signal is stopped because some abnormality such as failure or the like occurs in the ATM communication terminal concerned, the charge stored in the capacitor 605 is discharged through the resistor 605, and thus the voltage applied across both ends of the capacitor 605 is reduced.

The threshold value judgment circuit 606 compares the voltage across both ends of the capacitor 605 with a predetermined value to detect presence or absence of the output of the normal signal. When the output of the normal signal is detected, the switch 601 is changed over so that the transmission path at the upstream side of the ATM communication terminal is connected to the input terminal of the ATM communication terminal concerned. On the other hand, when no output of the normal signal is detected, the switch 601 is changed over so that the transmission path at the upstream side of the ATM communication terminal concerned is connected to the transmission path at the downstream side of the ATM communication terminal concerned.

For example, the normal signal may be generated and output by the following manner. Each constituent element of the ATM communication terminal is provided with detection means for detecting abnormality of the constituent element concerned, and the normal signal is output if some abnormality is detected by the detection means.

According to the second embodiment of the present invention, even when abnormality occurs in one of the ATM communication terminals constituting the ATM communication system and it is impossible to receive any ATM signal, the flow of the ATM signal at the ATM communication terminal concerned being cut off can be prevented.

Next, a third embodiment according to the present invention will be described.

Figure 7:
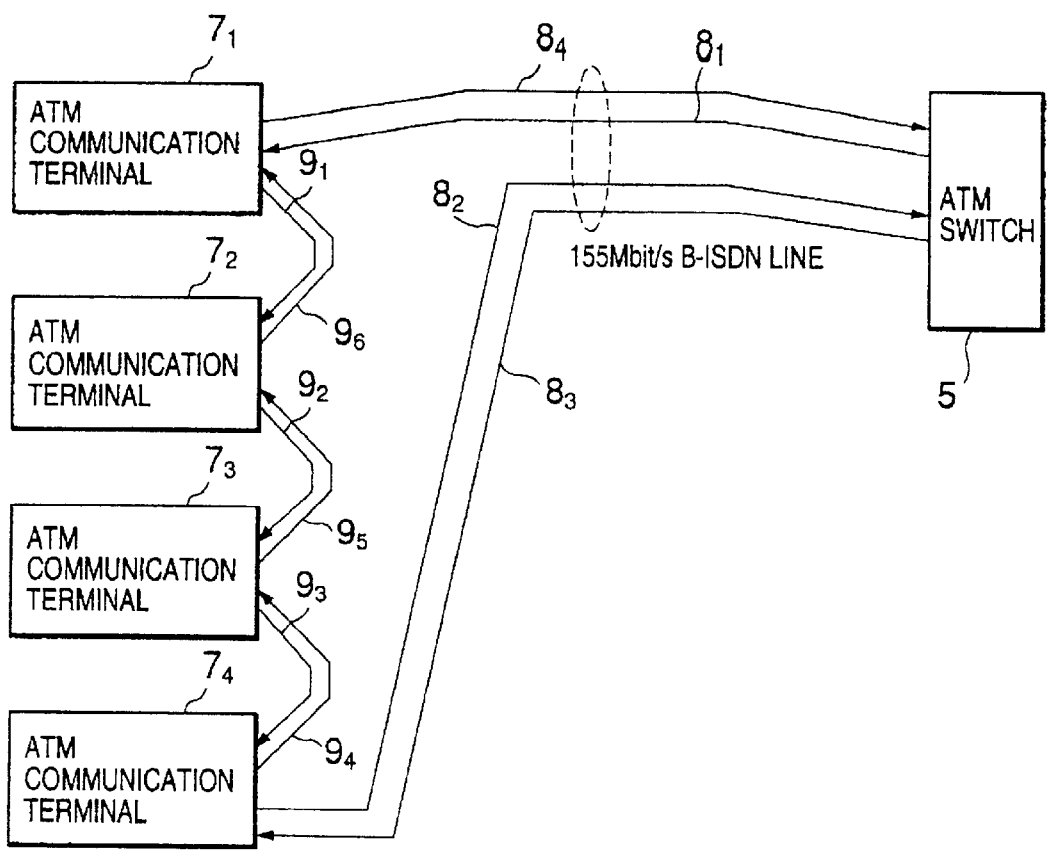
FIG. 7 is a diagram showing the configuration of an ATM communication system according to a third embodiment of the present invention.

FIG. 7 is a diagram showing the configuration of an ATM communication system according to a third embodiment of the present invention.

Here, reference numerals $7_1$ to $7_4$ represent ATM communication terminals, reference numerals $8_1$ to $8_4$ represent B-ISDN lines, and reference numeral $9_1$ to $9_6$ represent connection lines (for example, optical fibers) through which signals can be transmitted at the transmission rate of B-ISDN. In this embodiment, the elements having the same functions as the first embodiment shown in FIG. 1 are represented by the same reference numerals.

In this embodiment, as, shown in FIG. 7, each of the B-ISDN lines $8_1$ to $8_4$ (or, hereinafter merely referred to as "line 8") and the connection lines $9_1$ to $9_6$ (or, hereinafter merely referred to as "connection line 9") are dually wired so that the ATM switch 5 and the ATM communication terminals $7_1$ to $7_4$ (hereinafter merely referred to as "ATM communication terminal 7") are connected to one another through a dual ring with clockwise and counterclockwise transmission paths.

The ATM communication terminal 7 serves as both the ATM communication terminal 1 at the transmission side and the ATM communication terminal 2 at the reception side which are used in the first embodiment shown in FIG. 1.

Figure 8:
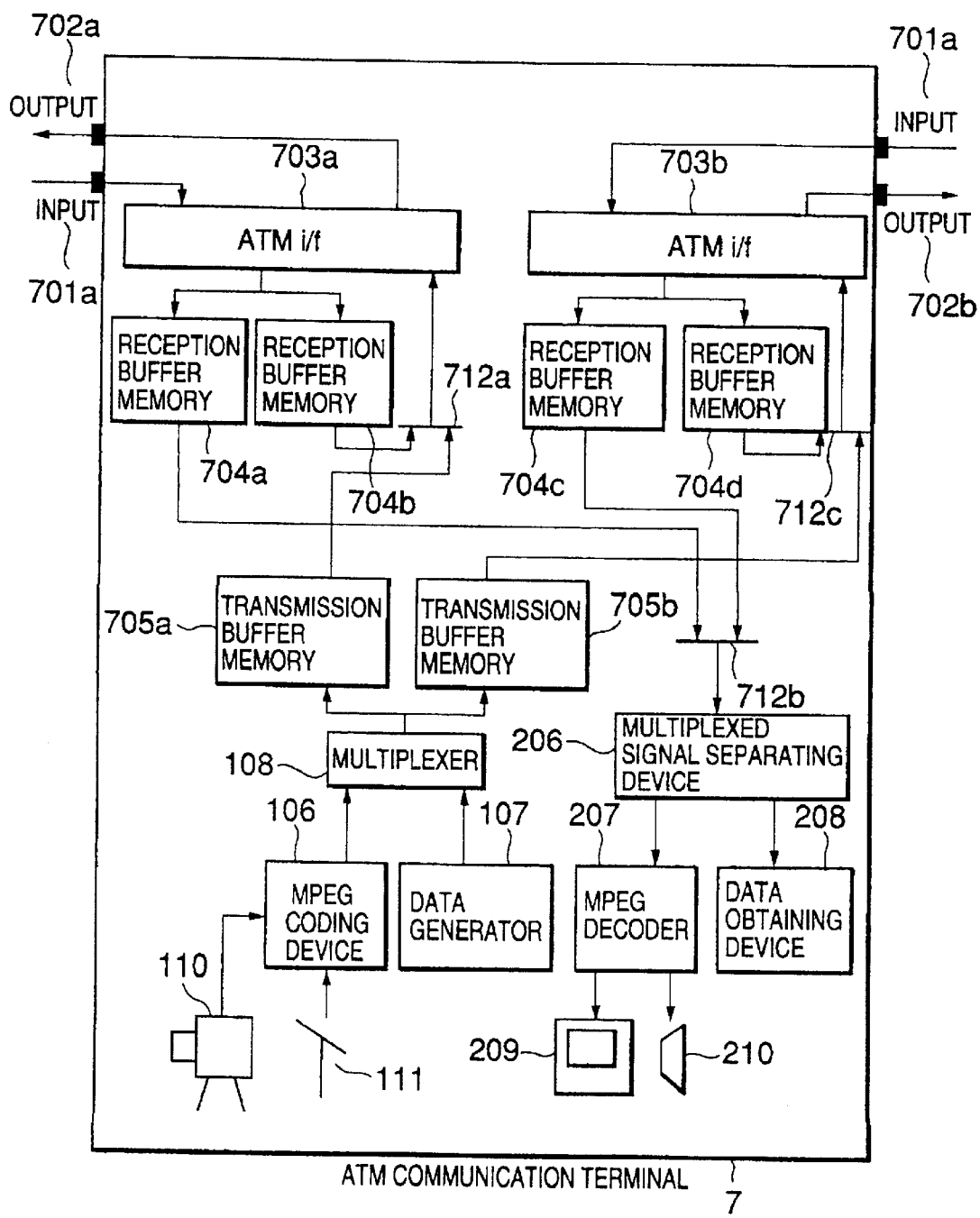
FIG. 8 is a diagram showing the configuration of an ATM communication terminal 7 shown in FIG. 7.

FIG. 8 is a diagram showing the ATM communication terminal 7.

Here, reference numeral 701a, 701b represents an input terminal for an ATM signal, reference numeral 702a, 702b represents an output terminal for an ATM signal, reference numeral 703a, 703b represents an ATM interface, reference numeral 704a to 704d represents a buffer memory for reception, reference numeral 705a, 705b represents a buffer memory for transmission, and reference numeral 712a to 712c represents a selector. The elements having the same functions as the ATM communication terminals shown in FIGS. 2 and 4 are represented by the same reference numerals.

The input terminal 701a and the output terminal 702a are used to input and output the ATM signal which is transmitted in a counterclockwise fashion (in the ring comprising the line $8_1$—the connection lines $9_1$ to $9_3$—the line $8_2$) in FIG. 7, respectively. The input terminal 701b and the output terminal 702b are used to input and output the ATM signal which is transmitted in a clockwise fashion (in the ring comprising the line $8_3$—the connection lines $9_4$ to $9_6$—the line $8_4$) in FIG. 7, respectively.

The ATM interface 703a receives the ATM signal through the input terminal 701a. Null cells are discarded from the ATM signal received, and the multiplexed signals are assembled for the residual cells for every destination information which is affixed to the header of each cell. Of the multiplexed signals thus assembled, the multiplexed signal addressed thereto (that is, ATM communication terminal concerned) is stored in the buffer memory 704a, and the multiplexed signals addressed to the other ATM communication terminals 7 are stored in the buffer memory 704b.

Further, the ATM interface 703a disassembles the multiplexed signal transmitted through the selector 712a into cells. If necessary, it adds null cells to the cells thus obtained so as to match the transmission rate of the B-ISDN line, and outputs these cells from the output terminal 702a.

The ATM interface 703b receives the ATM signal through the input terminal 701b. The null cells are discarded from the ATM signal received and the multiplexed signals is assembled for every destination information affixed to the header of each cell for the residual cells. In the multiplexed signals thus assembled, the multiplexed signal addressed thereto (ATM communication terminal concerned) is stored in the buffer memory 704c, and the multiplexed signals addressed to the other ATM communication terminals 7 are stored in the buffer memory 704d.

The ATM interface 703b disassembles the multiplexed signal transmitted through the selector 712c into cells. If necessary, it adds null cells to the cells so as to match the transmission rate of the B-ISDN line, and then transmits these cells from the output terminal 702b.

The operation of the ATM communication terminal 7 thus constructed will be described.

The ATM interface 703a assembles the multiplexed signal for every destination information from the ATM signal input to the input terminal 701a. Of the multiplexed signals thus assembled, the multiplexed signal addressed to the ATM communication terminal concerned is stored in the buffer memory 704a, and the multiplexed signals addressed to the other ATM communication terminals 7 are stored in the buffer memory 704b.

The multiplexed signal which is addressed to that ATM communication terminal itself and stored in the buffer memory 704a is transmitted through the selector 712b to the multiplexed signal separating device 206 to be multiplex-separated.

Further, the multiplexed signals which are address to the other ATM communication terminals and stored in the buffer memory 704b are transmitted through the selector 712a to the ATM interface 703a. Further, when the multiplexed signal generated by this ATM communication terminal itself is stored in the buffer memory 705a for transmission, the multiplexed signal concerned is transmitted through the selector 712a to the ATM interface 703a.

The ATM interface 703a disassembles into cells each of the multiplexed signal stored in the buffer memory 704b and the multiplexed signal stored in the buffer memory 705a, adds null cells to these cells, if necessary, and then transmits the cells from the output terminal 702a.

Through the above operation, each ATM communication terminal obtains the multiplexed signal addressed thereto from the ATM signal which is transmitted from the left side (that is, an upper stream side in a counterclockwise direction) thereof, and re-multiplexes the multiplexed signals addressed to the other ATM communication terminals and the multiplexed signal generated by the ATM communication terminals concerned to transmit the re-multiplexed signal to the right side (that is, an lower stream side in a counterclockwise direction) thereof.

Further, the ATM interface 703b assembles the multiplexed signals from the ATM signal input to the input terminal 702a for every destination information. Of these assembled multiplexed signals, the multiplexed signal addressed to the ATM communication terminal concerned is stored into the buffer memory 704c, and the multiplexed signals addressed to the other ATM communication terminals 7 are stored into the buffer memory 704d.

The multiplexed signal which is addressed to the ATM communication terminal concerned and stored in the buffer memory 704c is transmitted through the selector 712b to the multiplexed signal separating device 206 in which the multiplexed signal is subjected to the multiplexed signal separation processing.

On the other hand, the multiplexed signals which are addressed to the other ATM communication terminals 7 and stored in the buffer memory 704d are transmitted through the selector 712c to the ATM interface 703b. Further, when the multiplexed signal generated by the ATM communication terminal concerned is stored in the buffer memory 705b for transmission thereof, the multiplexed signal concerned is also transmitted through the selector 712a to the ATM interface 703b.

The ATM interface 703b disassembles each of the multiplexed signal stored in the buffer memory 704c and the multiplexed signals stored in the buffer memory 705b into cells, and adds null cells to these cells, if necessary, to transmit the cells from the output terminal 702b.

Through the above operation, the ATM communication terminal concerned obtains the multiplexed signal addressed thereto from the ATM signal transmitted from the right side (that is, an upper stream side in a clockwise direction) thereof, and re-multiplexes the multiplexed signals addressed to the other ATM communication terminals and the multiplexed signal generated by the ATM communication terminals concerned to transmit the re-multiplexed signal to the left side (that is, an lower stream side in a clockwise direction) thereof.

In this embodiment, even when the ATM communication terminal $7_2$ fails, the ATM communication terminal $7_1$ and the ATM switch 5 can form a ring therebetween by the transmission paths $8_1$ and $8_4$. Further, the communication terminals $7_3$ and $7_4$ and the ATM switch 5 can form a ring therebetween by the transmission paths $8_3$, $9_4$, $9_3$ and $8_2$.

Further, even when any one of the clockwise and counterclockwise transmission paths is cut off, the communication can be performed by using other transmission paths. Further, even when a transmission path is cut off at any point, for example, between the ATM communication terminals $7_1$ and $7_2$, the ATM communication terminal and the ATM switch can form a ring therebetween using the transmission paths $8_1$ and $8_4$. The other ATM communication terminals $7_2$ to $7_4$ can form a ring with the ATM switch by the transmission paths $8_3$, $9_4$, $9_5$, $9_2$, $9_3$, $8_2$. Accordingly, the ATM switch can receive the data transmitted from all the communication terminals.

In this embodiment, any one of the clockwise and counterclockwise transmission paths may be used as a backup path. In this case, the backup transmission path is used when the other transmission path fails.

When such a dual ring structure as described above is adopted, the system can be designed to have high resistance to problems such as failure of the communication terminals, occurrence of abnormality of the transmission paths, etc.

Figure 9:
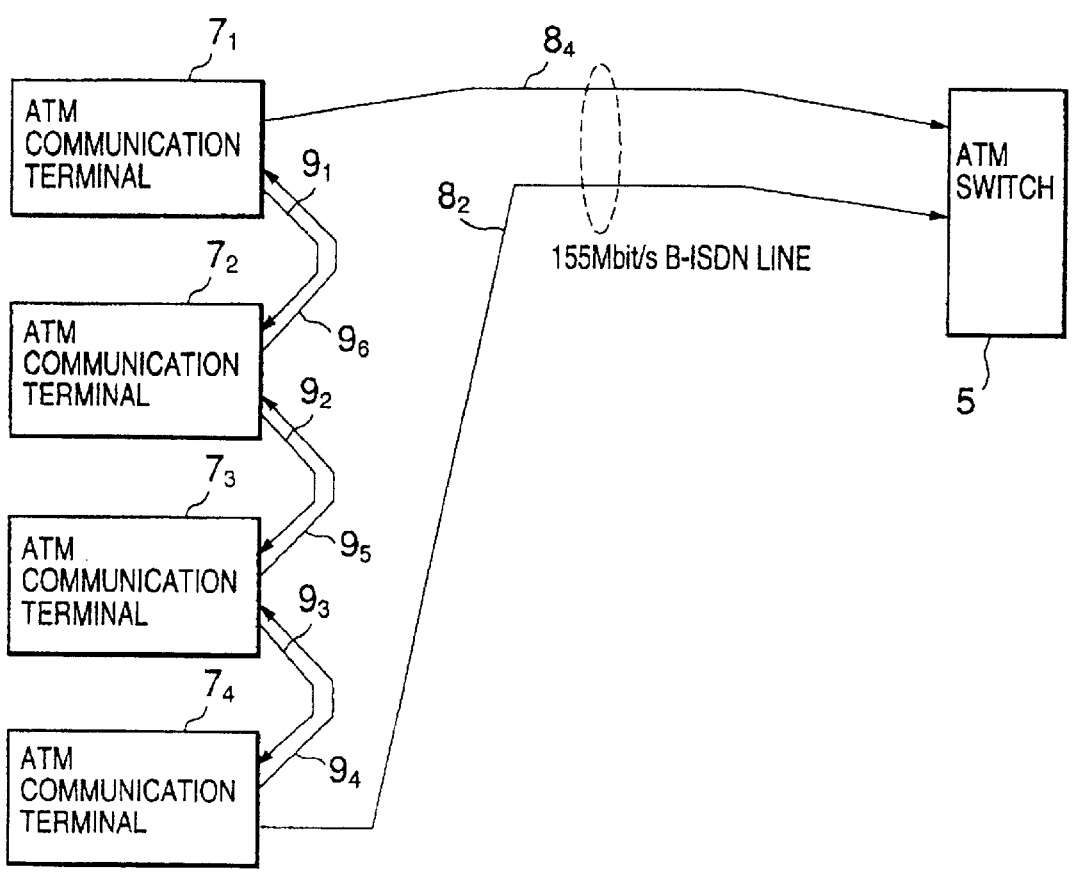
FIG. 9 is a diagram showing a modification of the third embodiment of the present invention shown in FIG. 7 in which a line for transmitting the output of the ATM switch 5 is omitted.

Further, in this embodiment, when the ATM communication terminal 7 needs no information from the ATM switch 5 (for example, when data transmission target is limited to a special one), the lines $8_1$, $8_3$ for transmitting the output of ATM switch can be omitted from the lines $8_1$ to $8_4$ which connect ATM switch and ATM communication terminal 7 each other as shown in FIG. 9. This is also satisfied for the case of the first embodiment shown in FIG. 1.

Next, a fourth embodiment according to the present invention will be described.

In an ATM, an identifier which is called "VCI (Virtual Channel Identifier)" is affixed to each cell to identify the type of signals to be transmitted and the address of a destination. Further, a handshaking procedure for starting communications is required to be carried out between the ATM switch and the ATM communication terminal when controlling the start of the communications, etc. Normally, a signal used for the handshaking procedure (handshake signal) is divided into plural cells, and transmitted onto the transmission path while mixed with normal data cells. The ATM switch collects cells having the same VCI number to assemble the handshake signal, and performs the handshaking procedures on the basis of the handshake signal.

A predetermined VCI number (for example, VCI=5) is frequently used as the handshake signal.

Therefore, in the above-described embodiments, when plural ATM communication terminals carry out the handshaking procedures for starting the communications at the same time, the cells of plural handshake signals having the same VCI number may be transmitted onto the same line while mixed with one another.

In this embodiment, each of the plural handshake signals can be reliably restored in the ATM switch even in such a situation.

Figure 10:
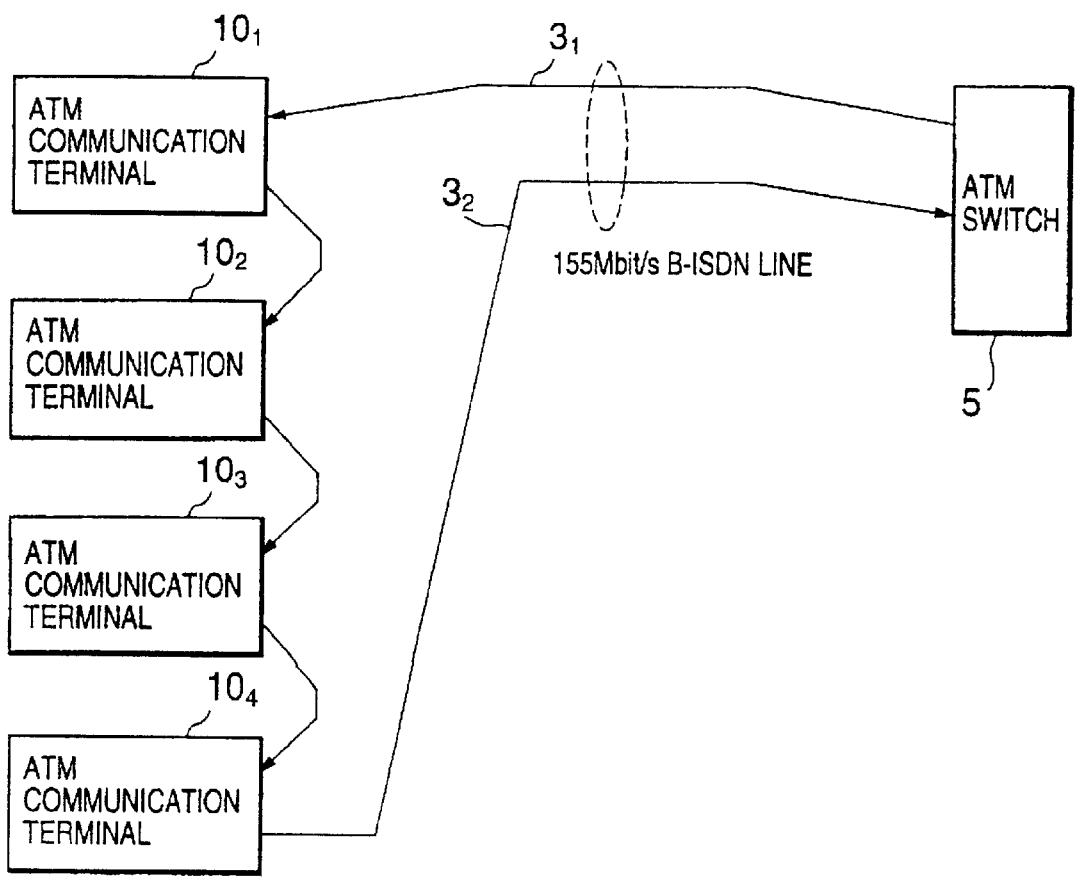
FIG. 10 is a diagram showing the configuration of an ATM communication system according to a fourth embodiment of the present invention.

FIG. 10 is a diagram showing the configuration of the ATM communication system according to a fourth embodiment of the present invention.

Here, reference numerals $10_1$ to $10_4$ represent ATM communication terminals. In this embodiment, the elements having the same functions as the first embodiment shown in FIG. 1 are represented by the same reference numerals.

Each of the ATM communication terminals $10_1$ to $10_4$ (or, hereinafter merely referred to as "ATM communication terminal 10") has both the functions of the ATM communication terminal 1 at the transmission side and the ATM communication terminal 2 at the reception side in the first embodiment shown in FIG. 1.

Figure 11:
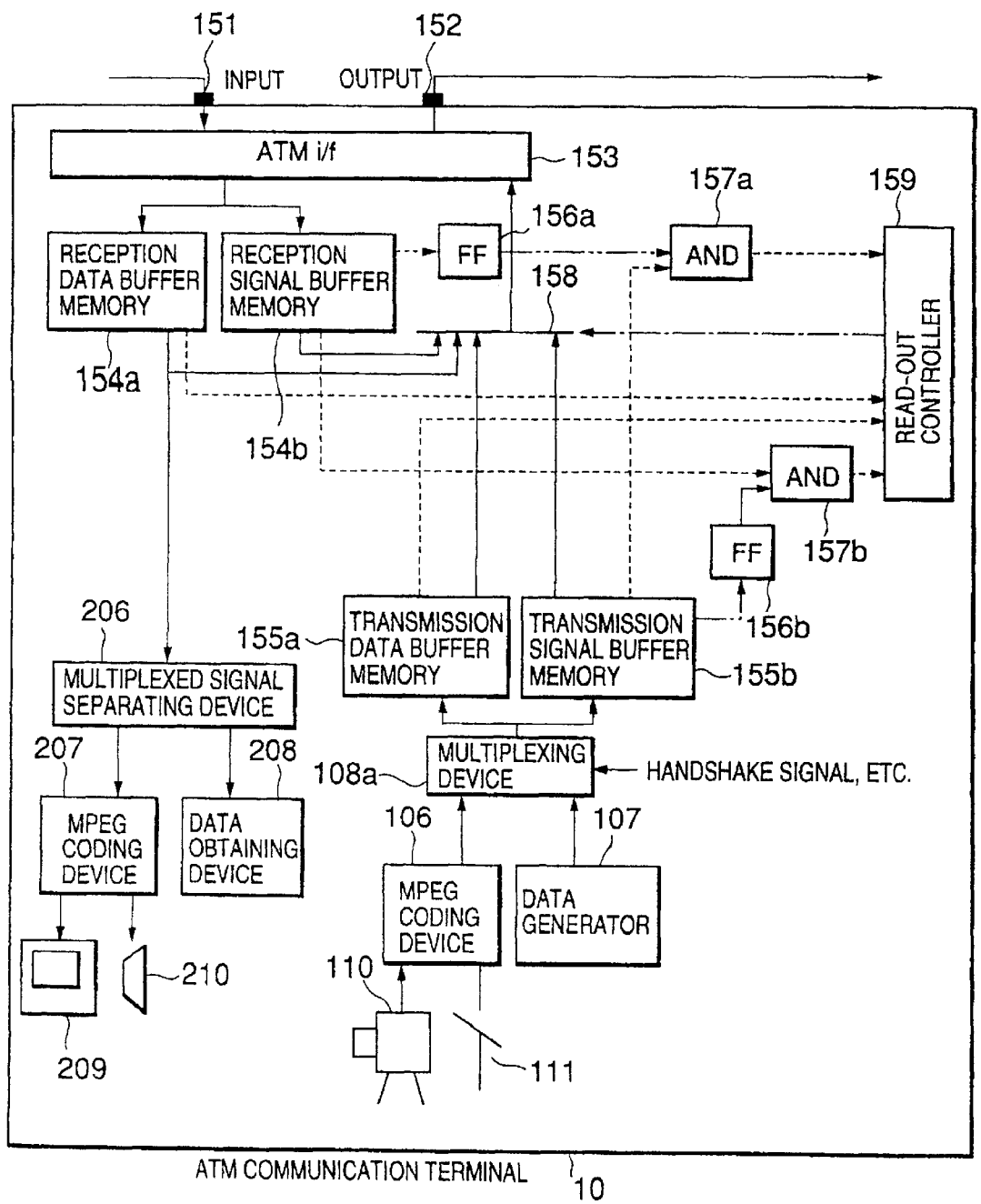
FIG. 11 is a diagram showing the configuration of an ATM communication terminal 10 shown in FIG. 10.
Figure 12:
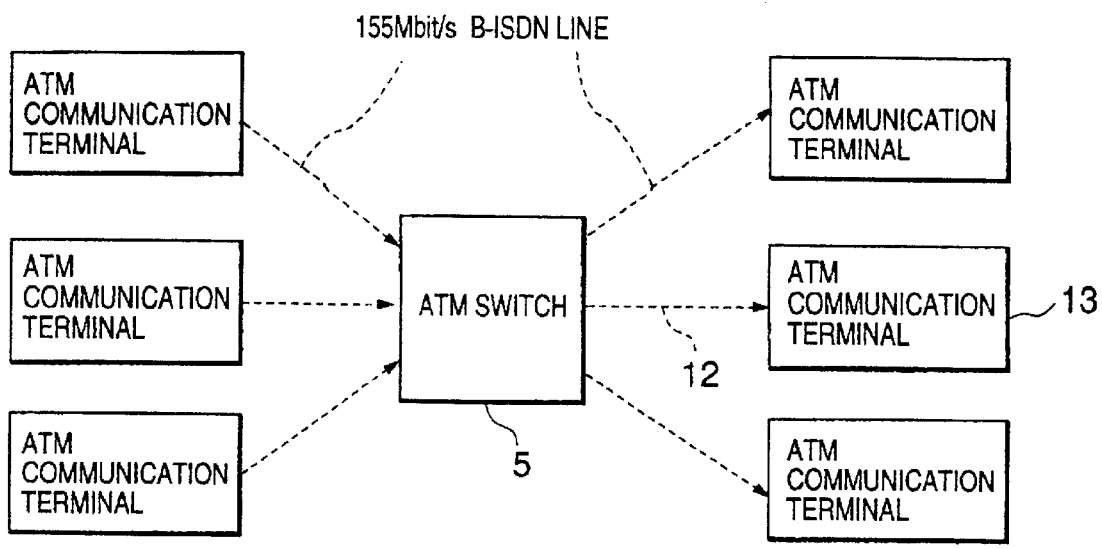
FIG. 12 is a diagram showing the configuration of a conventional ATM communication system.

FIG. 11 is a diagram showing the configuration of the ATM communication terminal 10.

Here, reference numeral 151 represents an input terminal for the ATM signal, reference numeral 152 represents an output terminal for the ATM signal, reference numeral 153 represents an ATM interface, reference numeral 154a represents a buffer memory for data reception, reference numeral 154b represents a buffer memory for signal reception, reference numeral 155a represents a buffer memory for data transmission, reference numeral 155b represents a buffer memory for signal transmission, reference numeral 156a, 156b represents a flip-flop, reference numeral 157a, 157b represents an AND circuit, reference numeral 158 represents a selector, reference numeral 159 represents a read-out controller and reference numeral 108a represents a multiplexer. The elements having the same functions as the ATM communication terminals shown in FIGS. 2 and 4 are represented by the same reference numerals.

The ATM interface 153 receives the ATM signal through the input terminal 151. It discards null cells from the ATM signal thus received and assembles multiplexed signals from the residual cells on the basis of the information which is affixed to the headers of the cells. Of the multiplexed signals thus assembled, the multiplexed signals concerning the normal data are stored in the buffer memory 154a, and the signals such as the handshake signal, etc. are stored in the buffer memory 154b.

The ATM interface 703a disassembles the multiplexed signals transmitted through the selector 158 into cells, adds null cells to the cells so as to match the transmission rate of the B-ISDN line, if necessary, and then transmits these cells from the output terminal 152.

The multiplexer 108*a* generates multiplexed signals concerning normal data such as video data, audio data and multiplexed signals concerning signals such as handshake signals. The multiplexed signals on the normal data are stored into the buffer memory 155*a* for data transmission, and the multiplexed signals concerning the handshake signal are stored into the buffer memory 155*b* for signal transmission.

The read-out controller 159 monitors a ready signal (indicated by a dotted line in FIG. 11) output from each of the buffer memories 154*a*, 154*b*, 155*a*, 155*b*, reads out the multiplexed signal from the buffer memory which outputs the ready signal and transmits it to the ATM interface 153 through the selector 158.

This embodiment is designed so that when the handshake signal (multiplexed signal) is read out from any one of the signal reception buffer memory 154*b* and the signal transmission buffer memory 155*b*, the input of the ready signal output from the other buffer memory into the read-out controller 159 is prevented, whereby the handshake signal which is stored in the signal reception buffer memory 154*b* and generated by another ATM communication terminal 10 and the handshake signal which is stored in the signal transmission buffer memory 155*b* and generated by the ATM communication terminal 10 concerned are prevented from being transmitted through the selector 158 to the ATM interface 153 at the same time.

That is, when the read-out of the data reception buffer 154*b* is started, the flip-flop 156*a* is reset, whereby the ready signal output from the data transmission buffer memory 155*b* is interrupted by the AND circuit 157*a* and thus it does not reach the read-out controller 159. When the readout of the data reception buffer memory 154*b* is completed, the flip-flop 156*a* is set, whereby the ready signal output from the data transmission buffer memory 155*b* reaches the read-out controller 159 through the AND circuit 157*a*.

Further, when the read-out of the data transmission buffer memory 155*a* is started, the flip-flop 156*b* is reset, whereby the ready signal output from the data reception buffer memory 154*b* is interrupted by the AND circuit 157*b* and thus it does not reach the read-out controller 159. When the read-out of the data transmission buffer memory 155*b* is completed, the flip-flop 156*b* is set, whereby the ready signal output from the data reception buffer memory 154*b* reaches the read-out controller 159 through the AND circuit 157*b*.

Through the above operation, the cells constituting the multiplexed signal of the handshake signal generated by the ATM communication terminal concerned and the cells constituting the multiplexed signal of the handshake signal generated by the other ATM communication terminals 10 can be prevented from being transmitted while mixed with each other.

Accordingly, the ATM switch 5 can reliably restore each of the plural handshake signals which are generated by plural ATM communication terminals 10.

Next, a fifth embodiment according to the present invention will be described.

Figure 13:
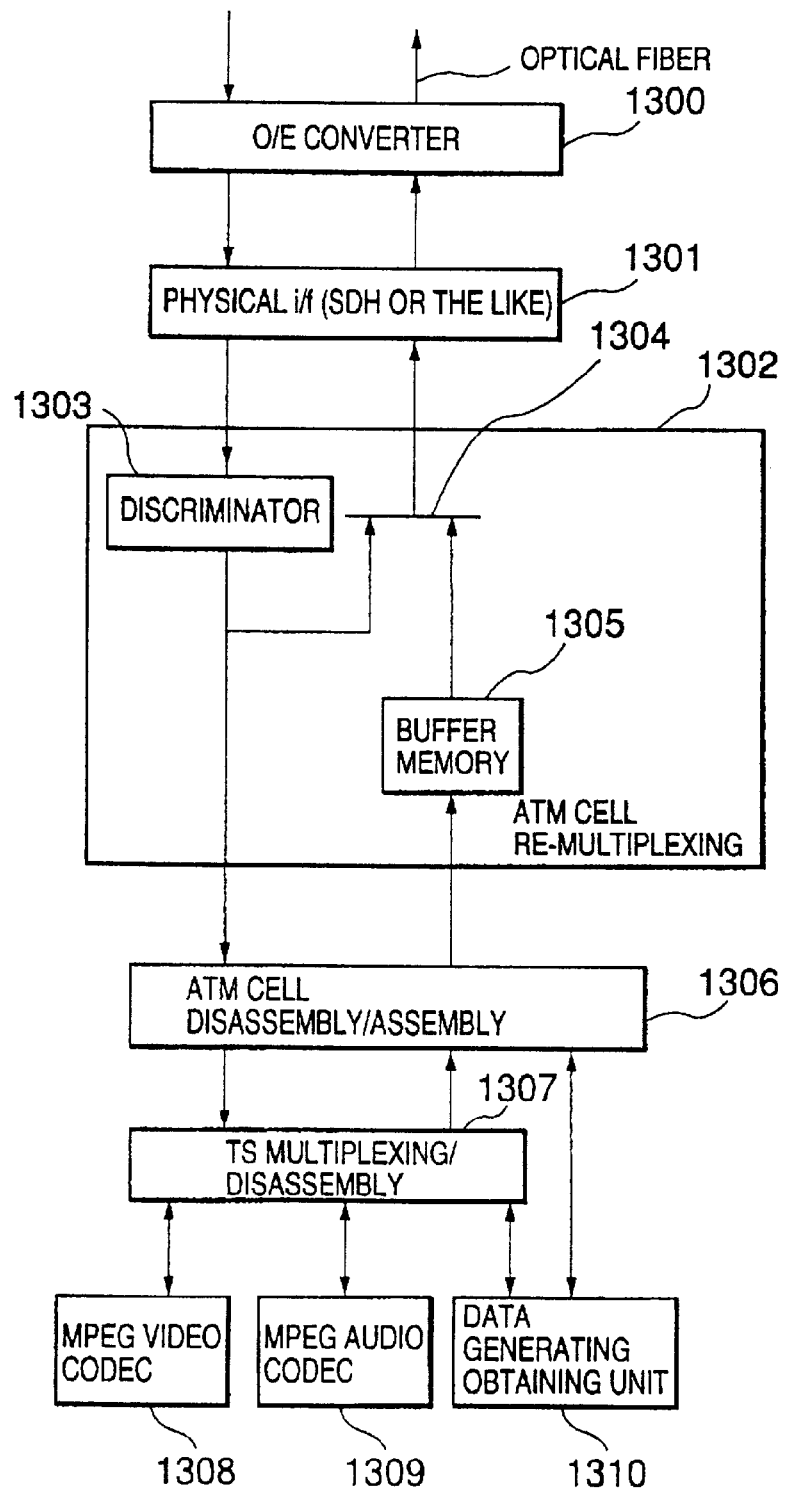
FIG. 13 is a diagram showing the configuration of an ATM communication terminal according to a fifth embodiment of the present invention.

FIG. 13 is a diagram showing the configuration of the ATM communication terminal device of the fifth embodiment according to the present invention.

In the fifth embodiment, each ATM communication terminal has both the functions of the ATM communication terminals at the transmission and reception sides. The system is constructed so that plural ATM communication terminals are connected to one another in a ring shape through high-speed transmission paths, as shown in FIGS. 7, 9 and 10. In the fifth embodiment, a mechanism of discriminating data addressed to the ATM communication terminal concerned and data addressed to ATM communication terminals located at the downstream side of the ATM communication terminal concerned is disposed before an assembling and disassembling device of ATM cells.

First, a signal which is transmitted through an optical fiber cable is converted to an electrical signal by an O/E converter 1300. The electrical signal thus obtained is a signal having such a format that ATM cells are packed in a frame for transmission. In a physical interface 1301, the electrical signal having such a transmission format is disassembled into ATM cells. The physical interface uses a transmission rate which is standardized as a synchronous digital hierarchy (SDH), for example. The overhead of a frame of SDH is referred in order to pick up ATM cells which are packed in a payload of SDH. The cells picked up from the SDH frame are discriminated into the data addressed to the ATM communication terminal concerned and the data addressed to ATM communication terminals located at the downstream side of the ATM communication terminal concerned in a discriminator 1303 of an ATM cell re-multiplexer 1302. Specifically, VCI contained in the header of each ATM cell is checked to judge whether the cell is a cell addressed to the ATM communication terminal concerned or a cell addressed to another ATM communication terminal at the downstream side of the ATM communication terminal concerned. If the cell is addressed to the ATM communication terminal concerned (i.e., the self ATM communication terminal), the cell is transmitted to an ATM cell disassembling/assembling unit 1306. In the ATM cell disassembling/assembling unit 1306, the ATM cell received is disassembled. Thereafter, a transport stream of MPEG is picked up and transmitted to a transport stream multiplexing/disassembling unit 1307. The transport stream multiplexing/disassembling unit 1307 disassembles the transport stream of MPEG to extract a coded video signal, a coded audio signal and data. The coded video signal is decoded by an MPEG image coding/decoding unit 1308 and displayed on a monitor (not shown). The coded audio signal is decoded by an MPEG audio coding/decoding unit 1309 and output from a speaker (not shown). The data are transmitted to the data generating/obtaining unit 1310. The data is a communication terminal control signal for controlling a camera, for example. The communication terminal controls the camera or the like on the basis of the received communication terminal control signal. When the communication terminal control signal is not multiplexed with the MPEG transport stream and received by another cell, it is directly delivered from the ATM cell disassembling/assembling device 1306 to the data generating/obtaining unit 1310.

On the other hand, the video signal and the audio signal which are to be transmitted from a communication terminal to another communication terminal are first coded by the video coding/decoding unit 1308 and the MPEG audio coding/decoding unit 1309.

The transport stream multiplexing/disassembling unit 1307 multiplexes the data generated in the data generating/obtaining unit 1310, the coded video signal and the coded audio signal to generate the transport stream. Alternatively, when the data is not multiplexed with the transport stream, the data generated in the data generating/obtaining unit 1310 are delivered to the ATM cell disassembling/assembling unit

1306. The ATM cell disassembling/assembling unit 1306 disassembles this transport stream to assemble the ATM cells and store them into the buffer memory 1305 of the ATM cell re-multiplexing unit 1302. The ATM cell re-multiplexing unit 1302 re-multiplexes these cells with cells which are transmitted from the discriminator 1303 and addressed to the communication terminals located at the downstream side of the ATM communication terminal concerned, and transmits the re-multiplexed cells to the physical interface unit 1301. The physical interface unit 1301 packs these cells in the frame of SDH, performs electro-optical conversion on the packed cells and then transmits them from the optical fiber.

The discrimination between the data addressed to the ATM communication terminal concerned and the data addressed to the ATM communication terminals at the downstream side of the ATM communication terminal concerned may be considered to be carried out between the physical interface and the ATM cell disassembling/assembling unit.

In FIGS. 2, 4, 8, 11 showing the communication terminals from the first to fourth embodiments, the O/E converter and the physical interface unit are not illustrated. However, they are provided in these embodiments in the same manner as shown in FIG. 13 when an optical fiber is used.

Further, the present invention is not limited to the above embodiments, and various modifications may be made to these embodiments without departing from the subject matter of the present invention.

For example, the above-described embodiments use B-ISDN as the line. However, the present invention is not limited to the above embodiments, and any line may be used insofar as the transmission rate thereof is higher than the transmission rate which is needed to accurately reproduce the signals reduced according to MPEG on a real-time basis.

The number of ATM communication terminals is not limited to that described in each of the above-described embodiments. In the present invention, the number of the ATM communication terminals may be increased within the range which is permissible by the transmission capacity of the line for connecting the ATM switch and the ATM communication terminals.

Further, the ATM communication terminals described in the above-described embodiments can be implemented by making a CPU execute predetermined programs stored in a storage medium such as a CD-ROM or the like in an information processing device having an ATM communication function and an MPEG coding or decoding function, such as a personal computer or the like.

The present invention is more effectively applied to surveillance systems such as a river surveillance system. In the river surveillance system, communication terminals are disposed at several to several tens of surveillance places along a river, and these communication terminals are connected to one another in a ring shape. For example, when the terminals are connected to one another by B-ISDN having a transmission rate of 155.52 Mbit/s and an MPEG transport stream of 6 Mbit/s is transmitted from each terminal, the number of the terminals on the ring is set to about 30 at maximum. Each communication terminal transmits a monitored image of the river picked up by a camera through an optical fiber to a surveillance center. The surveillance center monitors the image and transmits a camera control signal and a control signal for instructing an open/close operation of a floodgate to control the water amount of the river, if necessary. The destination of the control signal and the video signal is indicated by VCI. The VCI indication of the destination may be performed by indicating a number which is allocated to each of the terminals in advance. At this time, the discrimination in numbering between the terminals at the surveillance center and the terminals at the river side may be made, for example, by allocating the tens to the terminals at the surveillance center and allocating the hundreds to the terminals at the river. Further, in addition to the destination information, VCI may be added with information for identifying the data type of video, audio, data, normal telephone data. The overall configuration of the above applied system is the same as shown in FIG. 7 or FIG. 10. In the case of the applied system, the ATM switch 5 is replaced by the center terminal.

As described above, according to the present invention, the transmission capacity of the line can be used efficiently, and the number of lines disposed between the ATM switch and the ATM communication terminals constituting the system can be reduced to be as few as possible irrespective of the number of ATM communication terminals.

What is claimed is:

1. A communication system comprising n, n represents an integer, communication terminals, each of which has functions of disassembling into cells a multiplexed signal of fixed length obtained by multiplexing data, adding a header containing destination information to each of the cells and then transmitting/receiving the cells through a communication line, wherein each of said n communication terminals comprises:

a discriminator for discriminating a cell addressed to the communication terminal concerned, hereinafter self communication terminal, and a cell addressed to another of said n communication terminals by referring to the destination information of the cell received from an input terminal through said communication line, wherein cells which have been discriminated in said discriminator as being addressed to said self communication terminal are received in said self communication terminal and cells which have been discriminated in said discriminator as being addressed to said another communication terminal are provided for re-multiplexing to said another communication terminal;

a multiplexed signal generator for multiplexing data to be transmitted from the self communication terminal to generate a multiplexed signal;

a cell-forming unit for forming the multiplexed signal generated in said multiplexed signal generator into a cell; and a cell re-multiplexing unit for re-multiplexing the cell which is to be transmitted from said self communication terminal and generated from the multiplexed data, and cells which are discriminated by said discriminator and addressed to said another communication terminal, and transmitting the re-multiplexed cells from an output terminal to said communication line, wherein an output terminal of a first communication terminal and the input terminal of a second communication terminal in said n communication terminals are connected via a communication line, wherein an output terminal of an i-th communication terminal, where i represents an integer of 1 or more and (n−1) or less is connected to an input terminal of an (i+1)-th communication terminal, wherein an output terminal of an (n−1)-th communication terminal is connected to an input terminal of an n-th communication terminal, and wherein an output terminal of an n-th communication terminal is connected to an input terminal of said first communication terminal, whereby a ring-shaped transmission path is constructed among said n communication terminals so that data communication can be performed through said transmission path among said n communication terminals.

2. The communication system as claimed in claim 1, wherein:

said communication terminal further comprises a pair of input and output terminals, the output terminal of said n-th communication terminal is connected to the (n−1)-th communication terminal, the output terminal of said (i+1)-th communication terminal is connected to the input terminal of said i-th communication terminal, and the output terminal of said first communication terminal is connected to the output terminal of said n-th communication terminal, whereby a second ring is formed among said n communication terminals.

\* \* \* \* \*